United States Patent [19]
Johnson

[11] 3,909,278
[45] Sept. 30, 1975

[54] HIGH DENSITY THORIA-SILICA-METAL (III) OXIDE FIBERS

[75] Inventor: Donald D. Johnson, Chisago City, Minn.

[73] Assignee: Minnesota Mining and Manufacturing Company, St. Paul, Minn.

[22] Filed: Dec. 28, 1973

[21] Appl. No.: 429,197

[52] U.S. Cl. .............. 106/65; 106/66; 106/69; 106/73.2; 106/73.4; 106/73.5
[51] Int. Cl. ............................ C04b 35/50
[58] Field of Search ........ 106/55, 65, 66, 69, 73.2, 106/73.4, 73.5

[56] References Cited
UNITED STATES PATENTS

| | | | |
|---|---|---|---|
| 3,082,051 | 3/1963 | Wainer et al. | 106/73.2 |
| 3,082,099 | 3/1963 | Beasley et al. | 106/73.2 |
| 3,311,481 | 3/1967 | Sterry et al. | 106/50 |
| 3,503,765 | 3/1970 | Blaze | 106/65 |
| 3,585,153 | 6/1971 | Kiehl et al. | 106/66 |

Primary Examiner—J. Poer
Attorney, Agent, or Firm—Alexander, Sell, Steldt & DeLaHunt

[57] ABSTRACT

Transparent refractory fibers, at least 50 percent thoria and additionally containing silica and metal(III) oxides, particularly $Al_2O_3$ and $B_2O_3$ or $Cr_2O_3$ are made by shaping and dehydratively gelling, particularly by extruding in air, viscous aqueous thoria solutions or sols containing colloidal silica with boric acid-stabilized aluminum acetate, or additionally chromium acetate or colloidal $Cr_2O_3$, and heating the resulting gelled fibers in a controlled manner to decompose and volatilize undesired constituents and convert fibers to refractory fibers which are useful to form, for example, refractory fabrics, or as reinforcement for composites.

14 Claims, 1 Drawing Figure

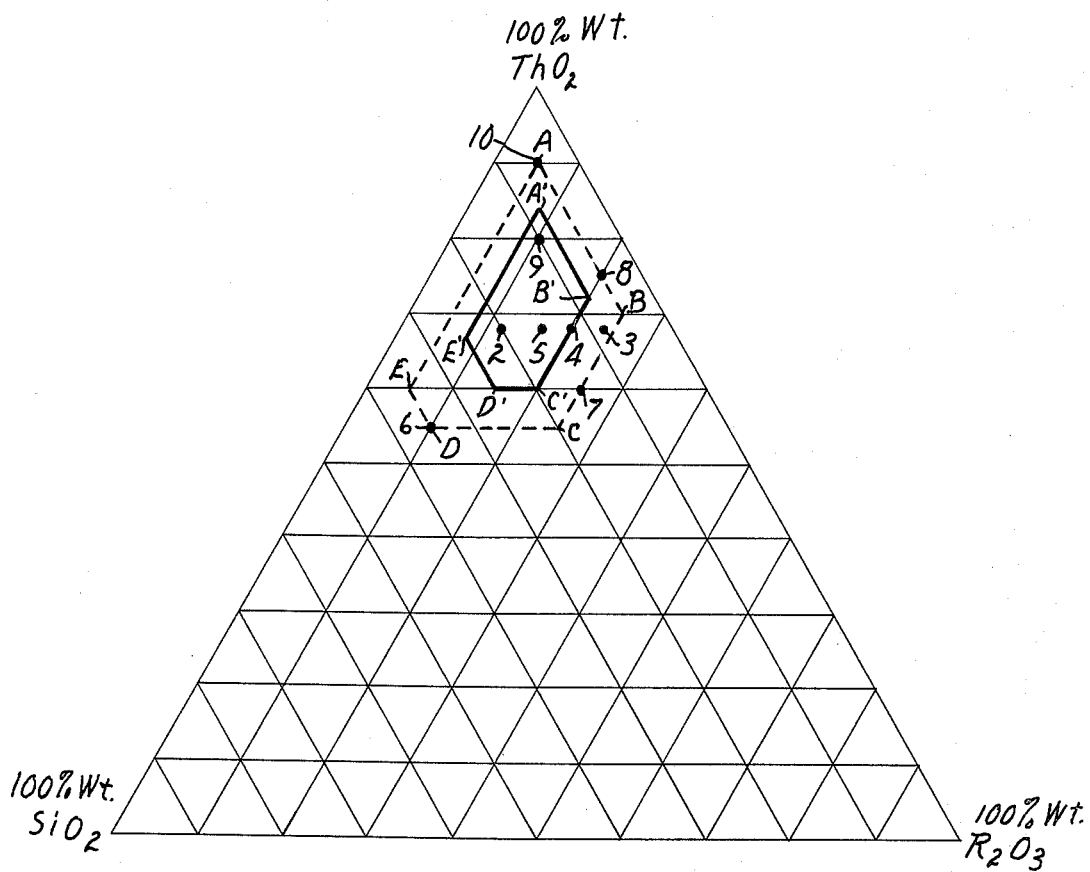

HIGH DENSITY THORIA-SILICA-METAL (III) OXIDE FIBERS

This invention relates to refractory fibers made of or containing thoria and silica with alumina and boria. In another aspect, it relates to continuous, transparent, strong, flexible, smooth, and glossy refractory fibers of at least 50 percent thoria together with silica and alumina and boria. The fibers of the invention may be colored when they contain chromia. These fibers are useful for reinforcement or to make refractory articles such as fabrics. In another aspect, the invention relates to a process for the preparation of such refractory fibers and to viscous aqueous composition of thorium oxysalt, colloidal silica and boric acid stabilized aluminum acetate. The composition can be extruded in air or otherwise spun, dehydratively gelled and then fired to form transparent, strong, high density thoria-silica fibers containing alumina and boria.

A number of patents and other published literature have described various polycrystalline, microcrystalline, or non-vitreous fibers and other shaped articles of refractory metal oxides made by various non-melt processes including processes employing or described as suitable for use with thoria. One process is by drying films of solutions of oxygen-containing metal compounds as in U.S. Pat. No. 3,057,744 or drying organic polymeric bodies, such as cellulose or rayon impregnated with solution containing thorium salts as described in U.S. Pat. Nos. 3,385,915 and 3,663,182. Glossy fibers comprising thoria are described in U.S. Pat. Nos. 2,969,272 and 3,132,033. The latter suggests the use of thoria containing glass fibers in chemical processing. Another method for production of inorganic fibers is by extruding and drawing, or spinning viscous fluids of suitable metal compounds into fibers, followed by heating to remove volatile materials such as water and organic matter to produce a refractory fiber as described in U.S. Pat. Nos. 3,311,481, 3,503,765 and particularly 3,322,865. The possibility of forming fibers containing thoria is mentioned in British Pat. No. 1,287,288 and fibers were made from a solution of $ThCl_4$ and $H_2SO_4$ by concentration and spinning in British Pat. No. 1,312,716. None of these shows high-density weavable continuous thoria-silica fibers and it is one object of this invention to provide continuous fibers comprising thoria and silica. Other objects will become evident hereinelsewhere.

The shaped and fired refractory fibers produced in accordance with above and other objects and aims of this invention comprise thoria and silica together with alumina and boria and optionally in some instances chromia. For convenience herein, the aluminum, chromium and boric oxides are designated generically as metal(III) oxides. Alumina and boria appear to be essential in order to obtain continuous fibers having high densities due to high thoria content. Such fibers are useful for their radiationscreening effect against x-rays and for reinforcement of plastics as in helicopter rotors. Alumina and boria appear also to be necessary to obtain fibers which can be woven. The refractory fibers of this invention are essentially free of any crystalline species except thoria, i.e., x-ray diffraction patterns of the refractory fibers of this invention show no discernible free alumina or other crystallites except microcrystalline thoria. The refractory fibers of this invention are also transparent, have no discernible graininess under binocular (e.g. 48X) microscopic examination, and are smooth-surfaced. Fibers are made which are continuous in length, strong, glossy and are sufficiently flexible to be readily handled without shattering and in preferred cases, at least, are weavable.

The fibers are usually transparent in the sense that when viewed in a liquid of suitably refractive index under a microscope, it is possible to discern the outlines of underlying fibers through superposed fibers. Such fibers may also be termed clear. On occasion, it is found that the fibers are not clear and may even be opaque so that underlying fibers are obscured. This may happen particularly when small amounts of carbon remain unoxidized in the fiber. Fibers which are partially opaque may be termed translucent.

The refractory fibers in their "green" or unfired form are made by extruding, drawing, spinning, or blowing, or combinations thereof, followed by dehydrative or evaporative gelling of a viscous concentrate of an aqueous mixture comprising thoria and silica with alumina and boria as such or as precursors to give a green, i.e., unfired, fiber. The green fibers are then heated to remove further water and other volatiles, decompose organic material and burn off carbon. A refractory fiber comprising thoria, silica and aluminum borate or aluminum borosilicate is thus obtained.

The term "continuous fiber" as used in this application means a fiber (or monofilament) which has a length which is infinite for practical purposes as compared to its diameter. The continuous fibers of this invention, in green or refractory form, can be as long as 3–6 meters, or longer, fibers of shorter length than this usually arise only from occasional flaws or minute inhomogeneities stemming from foreign particles or bubbles present in the viscous concentrate or from inadvertent mechanical fracture. By bringing a plurality of the fibers together in the form of a continuous strand, tow, yarn, hank, or other multifiber article, the occasional breakage or fracture of a few continuous filaments does not affect the practical utility of the multifiber article containing a few fibers whose lengths are relatively short. In any event, the fibers of this invention, even if broken or fractured for reasons given above, can be made in lengths which are significantly longer than the length of staple-fiber.

The accompanying drawing represents a ternary compositional diagram of the thoria, silica and metal-(III) oxide ($R_2O_3$) system with the compositions and preferred compositions of this invention designated thereon.

Referring to the drawing, the preferred refractory compositions of this invention fall within the area or along the boundry defined by A, B, C, D and E and have compositions within the range in percents by weight of 55–90 percent $ThO_2$, 5–35 percent $SiO_2$ and 5–25 percent $R_2O_3$ and preferably in the range designated A', B', C', D' and E' having values of 60–84 percent $ThO_2$, 8–25 percent $SiO_2$ and 8–20 percent $R_2O_3$. The points designated 2, 3, 4, 5, 6, 7, 8, 9 and 10 represent compositions shown in Examples of those numbers hereinafter. It will be seen that compositions of Examples 1 and 2 are the same and the composition of Example 11 (containing a small amount of $CrO_3$) is not shown.

The compositions from which the refractories of this invention are formed are viscous sols or solutions of thorium compounds with aluminum and boron compounds and containing colloidally dispersed silica. Preferably aqueous sols, solutions or dispersions of water-soluble or water-dispersible compounds of thorium and of aluminum and boron are used which can be calcined to the respective metal oxides, thoria, alumina and boria. In some instances a soluble or dispersed chromium compound which converts or may be chromia, $Cr_2O_3$, is also added. Generally, the thorium and silica compounds are present in aqueous dispersions of the invention in amounts sufficient to provide weight ratios of from about 1 ½:1 to about 10:1 of $ThO_2:SiO_2$.

Thoria is conveniently provided as a sol of thorium oxynitrate or oxychloride prepared from thorium hydroxide by dissolution or dispersion in less than the stoichiometric amount of nitric or hydrochloric acid, suitably with the addition of lactic acid in some instances. Generically, these compounds and others formed this way are termed thorium oxysalts whether they actually form solutions or are colloidal dispersions. The oxynitrate corresponds apparently to the thorium oxynitrate of Krüss and Palmaer, Zeitschrift anorganischer Chemie vol. 14, page 366, (1897). A convenient and preferred procedure for preparation of thorium oxynitrate is to precipitate thorium hydroxide from a solution of the nitrate in water and after washing the precipitate until wash waters have a pH of about 7 the hydroxide is then dispersed or dissolved in dilute nitric (or hydrochloric) acid to give the basic salt, believed represented as $Th(NO_3)_x(OH)_y$, where x and y are about 2, dissolved or dispersed in water.

As an illustration of the above procedure, thorium oxynitrate referred to in the examples below is prepared from 454 g. commercial thorium nitrate tetrahydrate dissolved in about 1500 cc water by precipitating $Th(OH)_4$ using 275 ml of 28 percent $NH_4OH$. The neutral precipitate after prolonged washing to pH about 7 is dispersed in 75 to 125 ml. of concentrated $HNO_3$ diluted with a large volume of water to give a clear solution or dispersion. The product thorium oxynitrate has $x=2.2$, $y=1.8$ approximately. Decreasing the proportion of nitric acid assists in compensating for spinning conditions of high relative humidity.

Silica is conveniently employed in the form of colloidal dispersions in water with $SiO_2$ concentrations of 1 to 50 weight percent. Preferred concentrations are 15 to 35 weight percent which are commercially available and from which less water has to be removed in raising the viscosity of the mixtures than when using more dilute dispersions. The colloidal silica can also be used in the form of organosols, the silica being colloidally dispersed in such water-miscible, polar organic solvents as normal or isopropyl alcohol, ethylene glycol, dimethylformamide, and various Cellosolve glycol ethers as methyl Cellosolve (2-methoxyethanol). Particular care may be necessary in the firing operation if such organic materials are not volatilized during evaporation steps. The size of the colloidal silica particles in the aquasols or organosols can vary, e.g. from 1 to 100 millimicrons, but generally will be on the order of 5 to 30 millimicrons, preferably about 10 to 16 millimicrons.

Preferred aqueous colloidal dispersions or sols which can be used in this invention are those sold under the trademarks "Ludox", "Nalco", and "Syton", such as Nalco 1030, Nalco 1034A, Nalco D-2139, and Syton 200. Table I sets forth the properties of various technical grades of aqueous colloidal dispersions of silica which can be used. These dispersions may contain impurities or stabilizers, e.g. sodium compounds, but the total amount thereof is generally less than 0.5 weight percent. In some cases it may be desirable to filter the silica dispersion to remove extraneous solids, bacterial growth, etc.

Table I

| Colloidal silica product | Particle size mμ | $SiO_2$ wt % | pH (at 25°C) |
|---|---|---|---|
| Ludox HS-40 | 13–14 | 40.1 | 9.54 |
| "HS | 13–14 | 30.1 | 9.8 |
| "LS | 15–16 | 30.1 | 8.3 |
| "SM-15 | 7–9 | 15.0 | 8.5 |
| "SM-30 | 7–8 | 29–31 | 9–10 |
| "TM | 22–25 | 49.0 | 8.5 |
| "AS | 13–14 | 30.1 | 9.4 |
| "AM | 13–14 | 30.1 | 8.8 |
| Nalco 1030 | 11–16 | 30.0 | 10.2 |
| Nalco 1034A | 16–22 | 34.5 | 3.1 |
| Nalco D-2139 | 5 | 25.0 | 10 |
| Syton 200 | 16 | 30.1 | 9.1 |

Fibers can be prepared in some instances using only the above thorium oxynitrate solution and a colloidal silica dispersion. Such fibers when of relatively high thorium content, as need to provide high-density fibers suitable for example, in weaving shielding fabric against x-rays or for use as reinforcements under tensile stress are, however, inclined to be excessively brittle and hence unsuited to the purposes. It is found that incorporation of at least about 5 percent of metal(III) oxide, i.e., boria and alumina together, suitably in a molar ratio of 1:3, provides composition from which fibers are readily spun and which provide highly refractory fibers of densities of the order of 3.5 to 6.0 grams per cubic centimeter or higher. The fibers of the invention can thus be characterized as high density fibers. For comparison, the density of $ThO_2$ is 9.86 g./cc. A small amount of chromia may be included to give a colored fiber.

An especially useful source of both alumina and boria is the powdered boric acid-stabilized basic aluminum acetate said to be represented by the formula $Al(OH)_2(OOCCH_3)\cdot\frac{1}{3}H_3BO_3$, which is sold under the trademark "Niaproof". This material contains an equivalent mol ratio of $Al_2O_3:B_2O_3$ of 3:1 and approximately 44.6 percent by weight of alumina and boria together. For convenience, this will sometimes be referred to as aluminum borate inasmuch as the acetic acid is ultimately lost. The compound can also be used in conjunction with greater or less amounts of alumina or boric acid or both. The pH values of aqueous solutions of this aluminum borate powder are less than 5 at concentrations of about 30 to 40 weight percent. It is usually present in dilute solutions used in the invention at about 5–20 percent. Although alumina and boria can be introduced from other precursors, for example, using aqueous boric acid-aluminum formoacetate or boric acid-aluminum chloride solutions, as well as finely divided alumina, it is preferred to employ the type of aluminum acetate-boric acid composition as described.

In the process of the invention, first a dilute aqueous solution or dispersion is prepared by combining the several ingredients, i.e., thoria, alumina and boria precursors and colloidal silica in the desired proportions to give a relatively dilute liquid, generally containing about 10 to 40 weight percent total solids. For the preparation of fibers, it is necessary to concentrate this dilute liquid to a sufficiently viscous or syrupy fluid so that it will gel when the concentrate is extruded and drawn in air. The concentration step is carried out by commonly used evaporative techniques either at ambient pressures and temperatures or preferably under vacuum. The procedures for evaporation are well known in the art and it is unnecessary to describe them in detail here.

Sufficient concentration of the dispersion to a spinning sol is attained when there is no separation of solids, the solids content is in the range of about 30 to 55 weight percent, and viscosities (Brookfield at ambient room temperature) are in the range of 15,000 to 1,000,000 cps., preferably 45,000 to 500,000 cps. The viscosity which is desired for particular equipment may vary. The viscous concentrates are relatively stable but low temperature storage may be preferred if the concentrate is not to be used shortly after preparation, e.g. within 24 hrs. Prior to dehydrative gelling or spinning, the concentrate is advantageously centrifuged to remove air bubbles and/or filtered to remove extraneous solid material, bacterial growth, etc., which might foul the spinneret. The viscous concentrate can be extruded under pressures of 3.5 to 70 kg/cm$^2$ using a conventional stainless steel spinneret with a plurality of orifices (e.g. 15 to 100 or more orifices with diameters of about 0.025 to 0.25 mm), such as used in the rayon industry, and for such purposes the viscosity and freedom from entrained bubbles and particles of the concentrate should be such that fibers are formed in a continuous manner without breaking of the extruded fiber as it is formed.

The viscous concentrates are preferably extruded through orifices and allowed to fall in air by the force of gravity or drawn mechanically in air by means of rolls or a drum or winding device rotating at a speed faster than the rate of extrusion. The forces exerted on the extruded fibers, e.g. gravity or drawing, cause attenuation or stretching of the fibers, reducing their cross-sectional area by about 50 to 90 percent and increasing their length by about 100 to 1000 percent and serve to hasten or aid the drying of fibers.

The spinning of fibers is carried out in ambient air but heated air can be used if desirable or necessary to obtain faster drying. The relative humidity of such air is preferably in the range of 10 to 25 percent at temperatures of 15° to 30°C. to minimize adhesion of fibers and more preferably in the range of 15–20 percent. Lower relative humidities cause no serious problems.

If the ambient humidity is above about 20 percent and up to about 50 percent and must be tolerated, some compensations can be made. Relative humidities above about 50 percent are best avoided. Possible compensations include using a concentrate with a higher viscosity, extruding at a lower rate, using a lower drawing rate, using a smaller extrusion orifice, exposing the green fibers to heated air at very low (ca. 0%) relative humidity as they are formed, and/or increasing the distances between the extrusion orifice and the point where the individual extruded fibers come into contact with one another.

The green fibers can be brought into contact to form a strand of multi-fibers and the strand can be sized with a water immiscible size to hold the fibers together without sticking. Where a size is used, the strand (or extruded fibers) can be mechanically drawn over a size applicator, like that used in the textile industry, and a conventional heat fugitive size or lubricant, such as an oil, applied. Heat lamps or the like can be used to volatilize the size so as to avoid combustion of the size when the green articles are fired because such combustion tends to cause overheating of the fibers during firing. The size may also require longer firing to completely remove it from the fired fiber.

Air currents should be minimized because they may cause the individual extruded fibers to come into contact before they are sufficiently dry or may cause fiber breakage. In any event, the extruded or otherwise gelled fibers should be made or handled under conditions which will prevent or minimize their contact with one another before they are sufficiently dry.

The fibers in the green or unfired gel form generally comprise about 40 to 80 weight percent solids and are dry in the sense that they do not adhere or stick to one another or other substrates and feel dry to the touch. However, they still contain substantial amounts of water and organic material, e.g. 20 to 60 weight percent, and it is necessary to heat or fire them to convert them to refractory fibers of the invention. The terms "dehydrative gelling" or "evaporative gelling", as used herein, therefore does not mean that all the water in the fibers is removed. Thus, in one sense, this step can be called partial dehydrative gelling. It may be noted at this point that the spun fibers in their green form are transparent and clear under an optical microscope; unless coloring additives are included in the viscous concentrate, they appear to look like colorless glass fiber. These green or unfired fibers are amorphous.

In order to remove the balance of water and organic material from the green or solidified gel fibers and convert them to refractory fibers, they are heated as single or plural fibers in an electric furnace, kiln, or the like in air or other oxidizing atmosphere, at moderately high temperature of about 600°, or as high as 1000°C., or higher. Various heating schedules can be employed but continuous passage through a zone at the desired temperature (about 750–1000°C.) is preferred. Likewise, rovings or woven fabrics may be heated.

In firing the green fibers, care should be exercised in controlling the rate of heating to minimize effects of too rapid decomposition reactions and to avoid ignition of combustible material in or evolved from the fibers because ignition of combustible materials may cause the formation of opaque or fragile fibers. One may start at a low temperature and elevate the temperature slowly while adding air cocurrently with the passage of the fibers through the furnace.

If the green fibers are not to be fired completely in one operation or are not to be fired immediately or soon after their formation, it may be desirable or necessary to store the fibers in a relatively dry or protective atmosphere to prevent them from picking up moisture or contaminants and deteriorating or sticking together.

The heating step volatilizes the balance of the water, decomposes and volatilizes organic material, and oxidizes carbon, the resultant article being an essentially carbon-free monolithic, homogeneous refractory fiber. This heating step also causes some shrinking of the article, the amount of linear shrinkage being generally 25 percent or more, and the volume shrinkage being generally 50 percent or more.

The continuous refractory fibers resulting from firing the green fibers at about 600°C. are microcrystalline and include crystallites of $ThO_2$ which are discernible by x-ray diffraction analysis. The refractory fibers are transparent or translucent, clear, glossy, smooth and colorless (unless chromium is used in addition to the $Al_2O_3$ or $B_2O_3$). They have useful strength and can be handled without breakage. The refractory fibers are continuous, round, or occasionally elliptical, in cross section and flexible. All of these properties are retained or enhanced upon firing to higher properties. The refractory fibers can be woven to form fabric which provides an efficient screen against x-rays. Fibers can also be used as reinforcements for plastics as in helicopter rotors where the additional mass provided by the high-density of the fibers without sacrifice of strength is advantageous. The fibers are also valuable for their refractory properties and insulative properties and can be employed where such properties are needed.

A preferred method and apparatus for forming the refractory fibers of this invention is that disclosed and claimed in U.S. Pat. No. 3,760,049.

The invention is now more particularly described by examples which show how the invention is practiced. In most cases, it is preferable to employ deionized water even if not indicated in each case.

EXAMPLE 1

Thorium hydroxide is precipitated from 450 g. of thorium nitrate tetrahydrate dissolved in about 1.5 l. of deionized water by addition of 275 ml. of 28 percent ammonium hydroxide at 20–25°C. The precipitate is collected on a filter. It is resuspended in deionized water and collected repeatedly until the wash waters have a pH of about 7. The thorium hydroxide (not dried) containing 200 g. $ThO_2$ is suspended in about 1.0 to 2.0 l. of water and 50 ml. of concentrated hydrochloric acid added. The suspension is stirred and the precipitate gradually dissolves in about 1 hour. This solution of thorium oxychloride is used in compositions of the invention alternatively to the oxynitrate described herein above. Analysis by evaporating to dryness and igniting shows that 533 g. of the solution contains 50 g. $ThO_2$.

To 533 g. of the solution are added 21 g. of boric acid-stabilized basic aluminum acetate (Niaproof; corresponding to 7.53 g. $Al_2O_3$ and 1.71 g. $B_2O_3$) and the mixture stirred until the solid has dissolved. The pH of the solution is determined and the pH of 48 g. of colloidal silica adjusted to approximately the same value in the range of 3–5 using nitric or hydrochloric acid. The acidified colloidal silica dispersion is added to the thoria-alumina solution gradually with agitation at room temperature. Failure to adjust the acidity may result in some precipitation when the solutions are mixed. The total solution is evaporated at about 30°C. to a small volume of viscous fluid which if necessary is de-aerated and filtered to remove any suspended solids. The viscous solution is extruded in a small laboratory spinner (about 30 orifices) at about 17.5 kg/cm² pressure and gives satisfactory unfired continuous green fibers. Firing in air, at a maximum of 750°C., by gradual admission to a zone at that temperature, produces strong continuous white transparent refractory fibers containing approximately 68 percent $ThO_2$, 20 percent $SiO_2$ and 12 percent of $Al_2O_3$ and $B_2O_3$ combined in a molar ratio of 3:1. These fibers can be knotted and can be woven to produce cloth. They can be used to reinforce plastics.

EXAMPLE 2

Continuous, transparent fibers similar in composition to those of Example 1 are made by preparing 13.3 kg. of a solution of thorium oxynitrate containing 1090 g. $ThO_2$, (the solution being prepared as described above) in which are dissolved 443.2 g. of boric acid stabilized basic aluminum acetate and to which are then added 1052 g. of a colloidal silica suspension (available as Ludox LS containing 30 percent $SiO_2$) adjusted to a pH of 4.1 by addition of concentrated nitric acid. The total spinning sol or composition is concentrated at 31°C. viscosity of 53,000 centipoises (measured at the same temperature). This spinning sol is extruded in apparatus as described in U.S. Pat. No. 3,760,049 and fired in air at a rate of 30.5 cm/min. to a temperature of 820°C. Excellent transparent, continuous, white, smooth fibers are obtained. Firing to 950°C. in air results in densification to give continuous transparent fibers of substantially the same composition as the fibers of Example 1 having a refractive index about 1.700, and a density of at least 5.0 g/cc. The fibers can be woven into cloth and provide a cloth having reduced transmission to x-rays.

This composition contains 68 percent $ThO_2$ and the balance is $Al_2O_3$, $B_2O_3$ and $SiO_2$ in the molar ration 3:1:10. Similar compositions are made in which this latter ratio is varied from 3:1:2 to 3:1:6 as set forth in the following Table 2.

Table 2

| Example | 3 | 4 | 5 |
|---|---|---|---|
| Molar ratio $Al_2O_3:B_2O_3:SiO_2$ | 3:1:2 | 3:1:4 | 3:1:6 |
| Thorium oxynitrate Sol (g.) | 965(a) | 697(b) | 831(b) |
| Aluminum borate (44.6% $Al_2O_3+B_2O_3$) | 77.5 | 42.2 | 42.2 |
| Colloidal Silica (30% $SiO_2$) | 36.8(c) | 40 | 60 |
| Composition of fibers (in % by weight) | | | |
| $ThO_2$ | 68 | 68 | 68 |
| $SiO_2$ | 7.8 | 12.5 | 15.7 |
| $R_2O_3$(d) | 24.2 | 19.5 | 16.3 |

(a)8.6% $ThO_2$ by weight
(b)9.4% $ThO_2$ by weight
(c)containing 10.3 g. dimethylformamide and acidified with 14.3 g. lactic acid.
(d)3 $Al_2O_3$. $B_2O_3$ The solution from each example is concentrated to a viscosity of 50,000 centipoises or more and fibers formed be drawing and extrusion. The fibers from Example 3 fire in air (procedure of U.S. Pat. No. 3,760,049) at 10 cm/min. at temperatures up to about 820°C. to give strong fibers which are somewhat blackened by inclusion of carbon. Fibers from Example 4 and 5 are also somewhat black but less so than those of Example 3. These fibers are continuous but because of occluded carbon are translucent or opaque.

In order to illustrate the ranges over which high density thoria-silica-metal(III) oxide fibers having densities of about 3.5 to about 6.0 are obtained, a series of further continuous fibers showing variations in composition are prepared as set forth in Table 3.

Table 3

| Example | 6 | 7 | 8 | 9 | 10 |
|---|---|---|---|---|---|
| Materials | | | | | |
| Thorium oxynitrate | 500(a) | 300(b) | 300(b) | 300(c) | 300(d) |
| Aluminum borate (44.6% $Al_2O_3+B_2O_3$) | 17.4 | 23.9 | 15.3 | 7.2 | 3.0 |
| Silica dispersion (30% $SiO_2$) | 90.4 | 21.3 | 5.7 | 10.7 | 4.5 |
| Composition | | | | | |
| % $ThO_2$ | 55 | 60 | 75 | 80 | 90 |
| % $SiO_2$ | 35 | 15 | 5 | 10 | 5 |
| % $R_2O_3$(e) | 10 | 25 | 20 | 10 | 5 |
| Density of Fiber (g/cc) | 4.05 | 3.91 | 4.14 | 5.90 | 6.50 |
| Refractive Index of fiber | ~.58 | ~.59 | — | ~.76 | 1.80 |
| Firing temperature(°C) | 800 | 800 | 850 | 850 | 850 |
| Firing rate(cm/min.) | 22.5 | 22.5 | 25 | 25 | 25 |
| Tensile Strength (1000 $kg/cm^2$) (f) | 2.8 | 5.6 | 7 | 7 | 2.1 |

(a)As Example 1 but dissolved with 75 ml conc. $HNO_3$; 8.53% $ThO_2$.
(b)As in Example 6 with further 8.3 g. conc. nitric acid; 8.53% $ThO_2$.
(c)As in Example 6 with further 4.2 g. conc. nitric acid; 8.53% $ThO_2$.
(d)As in Example 1 but dissolved with 100 cc. conc. HCl and 20 cc. lactic acid; 8.08% $ThO_2$.
(e)3 $Al_2O_3 \cdot B_2O_3$
(f)Approximate values only.

Each batch is concentrated and spun to give a hank of fibers which are fired as indicated. These fibers can be compared with those of Example 1–5 all of which contain 68 percent $ThO_2$. In all cases high-density continuous fibers are obtained with diameters of about 5 to 50 microns. The fibers of Examples 7 and 8 above, which have higher contents of the aluminum borate and hence more organic matter (the acetate group), tend to fire with included carbon, i.e., with black or blackish color. The fibers of Examples 9 and 10 with very high thoria contact tend to be somewhat elliptical in cross-section and somewhat friable indicating that a higher firing temperature would be advantageous. Fibers containing thoria at these higher concentrations are highly refractory and, after initial removal of volatile materials can be carried to well above 1000° and up to 1500°C.

EXAMPLE II

A thorium oxynitrate solution as used in Example 9 is prepared and combined with the same proportions of $SiO_2$ and $R_2O_3$ as in that example and additionally with a sol of sufficient $Cr_2O_3$ (available from Nalco) to correspond to 2 percent $Cr_2O_3$ in the final fibers. The fibers are fired at 25 cm. per minute to 850°C. to give strong transparent smooth continuous fibers having a greenish-brown color. The refractive index is about 1.7 or higher, the tensile strength about $9.1 \times 10^3$ $kg/cm^2$ on fibers about 5 to 10 microns in diameter. The density is variable, 4.85 and 5.36 in repeat tests possibly due to cavities within some of the fibers. The strength of the fibers is very high possibly being enhanced by the fineness.

What is claimed is:

1. A shaped and fired, continuous thoria-silica-alumina-boria fiber comprising thoria and silica together in major amount weight ratio of 1.5 : 1 to 10 : 1, 5 to 25 percent by weight of alumina and boria together in mole ratio of about 3 : 1 and 0 to 2 percent by weight $Cr_2O_3$.

2. A shaped and fired, continuous thoria-silica-alumina-boria fiber having a density of at least about 3.5 consisting of 55 to 90 percent thoria, 5–35 percent silica and 5 to 25 percent of oxides of alumina and boron in a mole ratio of about 3 : 1.

3. A shaped and fired, continuous, transparent thoria-silica-alumina-boria fiber having a density of at least about 3.5 consisting of 60–84 percent thoria, 8–25 percent silica and 8 to 20 percent of alumina and boria combined in a mole ratio of about 3 : 1.

4. A shaped and fired, continuous, transparent thoria-silica-alumina-boria fiber according to claim 3 having a density of about 6 grams per cubic centimeter.

5. A shaped and fired, flexible, continuous, transparent thoria-silica-alumina-boria fiber according to claim 3 having a molar ratio of alumina:boria:silica of 3 : 1 : 10 to 3 : 1 : 6.

6. A shaped and fired, flexible, continuous, transparent thoria-silica-alumina-boria fiber according to claim 5 having a molar ratio of alumina:boria:silica of 3 : 1 : 10.

7. A spinning solution comprising thoria, silica, alumina and boria in stable aqueous dispersion at concentrations of about 30–55 percent solids by weight in proportions by weight of 1.5 to 1 to 10 to 1 of thoria to silica and 5 to 25 percent alumina and boria in molar ratio of about 3 : 1, said solution having a viscosity of at least about 15,000 centipoises.

8. A spinning solution according to claim 7 wherein the thoria is present in stable aqueous dispersion as thorium oxynitrate or oxychloride.

9. A spinning solution according to claim 7 wherein the alumina and boria are present in stable aqueous dispersion as boric acid-stabilized aluminum acetate.

10. A process for the production of a continuous fiber spinning solution comprising thoria, silica, alumina and boria in stable aqueous dispersions in proportions by weight of 1.5 to 1 to 10 : 1 of thoria to silica and 5 to 25 percent of oxides of alumina and boria in molar proportions of about 3 : 1, said process comprising the steps of A. preparing a sol by dispersing thorium hydroxide in a sufficient volume of water to give a concentration of 5 to 10 percent weight $ThO_2$ with approximately one half the stoichiometric amount for complete reaction of an acid forming soluble salts of thoria;

B. adding alumina and boria precursors and colloidal dispersion of silica to the previously prepared sol, comprising thorium oxysalt and C. concentrating the solution comprising thorium oxysalt, alumina and boria precursors and colloidally dispersed silica by removal of water therefrom until the residue reaches the viscosity of at least 15,000 centipoises at from 25° to 35° C. and contains from about 30 to 55 percent solids.

11. Process according to claim 10 wherein the alumina and boria precursor is boric acid-stabilized aluminum acetate.

12. Process for production of continuous fibers of thoria, silica, alumina and boria comprising the steps of
A. extruding through orifices into air, at a relative humidify of less than 50 percent, a viscous aqueous dispersion of thorium oxysalt, colloidal silica and alumina and boria precursors in proportions such that $ThO_2$, $SiO_2$, and $Al_2O_3$ and $B_2O_3$ together as $R_2O_3$ in molar proportions of about 3 : 1 fall within the area of A, B, C, D, E of the drawing and at a rate such that continuous green fibers are produced and
B. firing said green fibers in air up to a temperature of 700° to 1000° C. whereby high-density continuous fibers of thoria, silica, alumina and boria characterized by the presence of crystallites of thoria and densities of at least about 3.5 are produced.

13. Process according to claim 12 wherein thorium oxysalt is thorium oxynitrate and alumina and boria precursor is boric acid-stabilized aluminum acetate.

14. A fabric composed of shaped and fired, continuous thoria-silica-alumina and boria fibers comprising thoria and silica together in major amount and alumina and boria together in minor amount.

* * * * *